(12) United States Patent
Jin et al.

(10) Patent No.: US 12,633,812 B2
(45) Date of Patent: May 19, 2026

(54) VIBRATING MOTOR WITH ELASTIC PIECE WITH ARMS AND FIXING PORTION FIXED TO MASS BLOCK

(71) Applicant: AAC Microtech (Changzhou) Co., Ltd., Changzhou (CN)

(72) Inventors: Xin Jin, Changzhou (CN); Fan Zhang, Changzhou (CN); Wei Song, Changzhou (CN); Ronglin Linghu, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 398 days.

(21) Appl. No.: 18/334,345

(22) Filed: Jun. 13, 2023

(65) Prior Publication Data

US 2024/0235354 A1 Jul. 11, 2024

Related U.S. Application Data

(63) Continuation of application No. PCT/CN2023/072802, filed on Jan. 18, 2023.

(30) Foreign Application Priority Data

Jan. 5, 2023 (CN) .......................... 202320024371.8

(51) Int. Cl.
| | |
|---|---|
| *H02K 33/06* | (2006.01) |
| *H02K 1/34* | (2006.01) |
| *H02K 33/18* | (2006.01) |

(52) U.S. Cl.
CPC .............. *H02K 33/06* (2013.01); *H02K 1/34* (2013.01); *H02K 33/18* (2013.01)

(58) Field of Classification Search
CPC ........ H02K 33/00; H02K 33/02; H02K 33/04; H02K 33/06; H02K 33/16; H02K 33/18;
(Continued)

(56) References Cited

U.S. PATENT DOCUMENTS

| | | | |
|---|---|---|---|
| 10,129,655 B2 * | 11/2018 | Zhu | .......................... H04R 9/02 |
| 11,289,990 B2 * | 3/2022 | Tao | ........................ H02K 33/18 |

(Continued)

FOREIGN PATENT DOCUMENTS

| | | | | |
|---|---|---|---|---|
| CN | 213661937 U | * | 7/2021 | .............. H04R 9/04 |
| CN | 214101157 U | * | 8/2021 | |

(Continued)

*Primary Examiner* — Maged M Almawri
(74) *Attorney, Agent, or Firm* — Wiersch Law Group

(57) ABSTRACT

A vibrating motor includes a housing defining an accommodating space, a vibrating unit accommodated in the accommodating space, an elastic piece elastically suspending the vibrating unit, and a driving assembly accommodated in the housing. The driving assembly drives the vibrating unit to vibrate. The vibrating unit includes a mass block and a rotor fixed to the mass block. The elastic piece and the mass block are integrally formed through stamping. A position precision of the elastic piece is high, which improves a consistency of the vibrating motor, reduces a stress fluctuation of the elastic piece in a vibrating state, and reduces a possibility of fracture and reliability failure thereof. Moreover, two elastic portions disposed on two sides of the elastic piece are consistent, symmetry of a rotor system is improved, a swing degree of the vibrating motor is reduced, and a performance and a yield level thereof are improved.

9 Claims, 7 Drawing Sheets

(58) Field of Classification Search
CPC ........ H02K 35/00; H02K 35/02; H02K 35/04;
H02K 35/06; B06B 1/00; B06B 1/02;
B06B 1/0215; B06B 1/0223; B06B
1/0269; B06B 1/0614; B06B 1/04; B06B
1/045; H02N 11/00; H02N 11/002; H02N
11/04; H02N 11/06
USPC ...................................................... 310/15–28
See application file for complete search history.

(56) References Cited

U.S. PATENT DOCUMENTS

| | | | |
|---|---|---|---|
| 12,143,796 B2 * | 11/2024 | Tong ...................... | H04R 9/046 |
| 2015/0123498 A1 * | 5/2015 | Yang ...................... | H02K 33/16 |
| | | | 310/25 |
| 2018/0234771 A1 * | 8/2018 | Hsieh .................... | H02K 33/12 |
| 2023/0253865 A1 * | 8/2023 | Huang .................... | H02K 5/24 |
| | | | 310/15 |
| 2023/0253868 A1 * | 8/2023 | Yan ........................ | H02K 33/18 |
| | | | 310/28 |

FOREIGN PATENT DOCUMENTS

| | | | | | | |
|---|---|---|---|---|---|---|
| CN | 113453128 | A | * | 9/2021 | ............... | H04R 9/06 |
| CN | 113453128 | B | * | 3/2022 | ............... | H04R 7/16 |
| CN | 217307447 | U | * | 8/2022 | | |
| CN | 115396792 | A | * | 11/2022 | ............ | H04R 9/025 |
| CN | 218335701 | U | * | 1/2023 | | |
| JP | 2018014871 | A | * | 1/2018 | ............ | H02K 33/16 |
| KR | 102268188 | B1 | * | 6/2021 | ............... | H04R 1/26 |
| WO | WO-2020134472 | A1 | * | 7/2020 | ............ | H02K 33/16 |
| WO | WO-2021114278 | A1 | * | 6/2021 | ............... | H04R 7/16 |
| WO | WO-2022006887 | A1 | * | 1/2022 | ............... | H02K 1/12 |

* cited by examiner

200

VIBRATING MOTOR WITH ELASTIC PIECE WITH ARMS AND FIXING PORTION FIXED TO MASS BLOCK

TECHNICAL FIELD

The present disclosure relates to a field of electro-acoustic conversion, and in particular to a vibrating motor.

BACKGROUND

With continuous innovation of smart mobile devices, the smart mobile devices are more and more popular among users. The most common smart mobile devices are cell phones, tablets, and handheld gamepads. A vibration function is a basic function of the smart mobile devices, therefore, a vibrating motor with the vibration function is widely used in the smart mobile devices.

The vibrating motor in the prior art mainly comprises a housing, a vibrating unit accommodated in the housing, elastic pieces elastically suspending the vibrating unit in the housing, and a driving assembly for driving the vibrating unit to vibrate. In order to increase a weight of the vibrating unit, so as to improve a vibrating amplitude of the vibrating unit and a vibrating effect, the vibrating unit generally additionally comprises a mass block. Namely, the elastic pieces elastically suspend the mass block in the housing, and other components of the vibrating unit are fixed to the mass block.

The vibrating motor in the prior art generally comprises two elastic pieces. A first end of each of the elastic pieces is welded to the mass block, and a second end of each of the elastic pieces is welded to the housing. Thus, the mass block is suspended in the housing through the elastic pieces.

In above fixing mode of the elastic pieces, although the mass block is elastically suspended in the housing, a precision of relative positions of the elastic pieces and the mass block is poor, which easily leads to an inconsistent performance of the vibrating motor, leads to a high stress fluctuation of the elastic pieces in a vibrating state, and leads to a high possibility of fracture and reliability failure of the elastic pieces. Moreover, the two elastic pieces are hardly manufactured by a same mold at the same time, so the two elastic pieces are unable to be consistent, which reduces symmetry of a rotor system in the vibrating motor. As a result, the vibrating motor has a high swing degree, which reduces a performance and a yield level of the vibrating motor. In addition, the above-mentioned elastic pieces take up a lot of space, cost a lot of materials, and have high manufacturing cost.

Therefore, it is necessary to provide a vibrating motor to solve at least one technical problem mentioned above.

SUMMARY

A purpose of the present disclosure is to provide a vibrating motor to solve at least one technical problem of a vibrating motor in the prior art.

The present disclosure provides the vibrating motor. The vibrating motor comprises a housing defining an accommodating space, a vibrating unit accommodated in the accommodating space, an elastic piece elastically suspending the vibrating unit in the accommodating space, and a driving assembly fixedly accommodated in the housing.

The driving assembly is configured to drive the vibrating unit to vibrate. The vibrating unit comprises a mass block and a rotor fixed to the mass block. The driving assembly is one of at least one driving coil and a magnetic steel assembly. The rotor is the other one of the at least one driving coil and the magnetic steel assembly. A first end of the elastic piece is fixed to the mass block. A second end of the elastic piece is fixed to the housing. The elastic piece and the mass block are integrally formed through stamping.

Optionally, the elastic piece comprises a fixing portion stacked on one side of the mass block and two elastic portions. The fixing portion is integrally formed with the mass block by stamping. The two elastic portions are respectively bent and extended from two diagonal positions of the fixing portion. Each of the elastic portions comprises a first arm, a second arm, an elastic arm, and a fixing arm. Each first arm is bent and extended from the fixing portion. Each first arm is attached to a first side of a corresponding corner of the mass block. Each second arm is extended perpendicularly from a corresponding first arm. Each second arm is attached to a second side of the corresponding corner of the mass block. Each elastic arm is bent and extended from the fixing portion. Each elastic arm is spaced apart from the mass block. Each fixing arm is bent and extended from a first end of a corresponding elastic arm away from a corresponding second arm. Each fixing arm is fixed to the housing. A second end of each elastic arm close to the corresponding second arm is attached and fixed to the corresponding second arm. Two elastic arms are respectively disposed on two opposite sides of the mass block. The two elastic portions are symmetrically disposed with respect to a center of the mass block.

Optionally, each first arm and each second arm are integrally formed with the mass block by stamping.

Optionally, one side of the mass block close to the driving assembly is recessed to form a mounting groove. The rotor is fixedly accommodated in the mounting groove.

Optionally, the driving assembly is the at least one driving coil fixed to the housing. The rotor is the magnetic steel assembly. The magnetic steel assembly comprises a main magnetic steel fixed in the mounting groove and at least two auxiliary magnetic steels fixed in the mounting groove. The at least two auxiliary magnetic steels are respectively disposed on two opposite sides of the main magnetic steel.

Optionally, the vibrating motor further comprises a flexible conductive connecting piece fixed in the housing. The flexible conductive connecting piece passes through the housing and extends outwards from the housing. The at least one driving coil is electrically connected to the flexible conductive connecting piece.

Optionally, the housing defines a sound outlet penetrating the housing. The vibrating unit further comprises a basin frame fixed to the housing, a vibrating system fixed to the basin frame, and a magnetic circuit system fixed to the basin frame. The magnetic circuit system is configured to drive the vibrating system to vibrate. The vibrating system is communicated with the sound outlet to generate sound. The driving assembly and the magnetic circuit system are the magnetic steel assembly. The rotor is the at least one driving coil fixed to the mass block.

Optionally, the magnetic circuit system comprises a lower clamping plate, a first main magnetic steel, an upper clamping plate, a second main magnetic steel, first auxiliary magnetic steels, and an auxiliary pole core.

The first main magnetic steel is fixedly stacked on one side of the lower clamping plate close to the vibrating system. The upper clamping plate is fixedly stacked on one side of the first main magnetic steel close to the vibrating system. The second main magnetic steel is fixedly stacked on one side of the upper clamping plate close to the vibrating system. The first auxiliary magnetic steels are disposed around the first main magnetic steel. The first auxiliary magnetic steels are spaced apart from the first main magnetic steel to form a magnetic gap. The auxiliary pole core is fixedly stacked on one side of each of the first auxiliary magnetic steels close to the vibrating system. Two of the first auxiliary magnetic steels are fixedly stacked on one side of the lower clamping plate close to the vibrating system. The two of the first auxiliary magnetic steels are disposed opposite to each other.

The vibrating motor further comprises a fixing piece. The fixing piece is ring-shaped. A first side of the fixing piece close to the basin frame is fixed to the basin frame. The auxiliary pole core is fixed to a second side of the fixing piece away from the basin frame.

Optionally, the rotor further comprises two rotor magnetic steels and two rotor pole cores. The rotor magnetic steels are fixed to the mass block. The rotor magnetic steels are respectively disposed on two opposite sides of the first main magnetic steel. Each of the two rotor pole cores is fixedly stacked on one side of a corresponding rotor magnetic steel away from the mass block. Two driving coils are provided. The two driving coils are fixed to the mass block at intervals. The two driving coils are disposed between the two rotor magnetic steels.

Optionally, the vibrating system comprises a diaphragm fixed to the basin frame, a voice coil, a frame fixed to the diaphragm, and auxiliary elastic pieces. The voice coil is inserted into the magnetic gap and is suspended in the magnetic gap. The voice coil drives the diaphragm to vibrate. The auxiliary elastic pieces are spaced apart from the diaphragm. The diaphragm is fixedly clamped between the fixing piece and the basin frame. The voice coil is elastically suspended in the magnetic gap by the frame. A first end of each of the auxiliary elastic pieces is fixed to one side of the fixing piece away from the basin frame. A second end of each of the auxiliary elastic pieces is fixed to one end of the frame away from the voice coil.

Compared with the prior art, in the vibrating motor of the present disclosure, the elastic piece and the mass block are integrally formed through stamping, so that a precision of a relative position of the elastic piece and the mass block is converted into the tolerance of the elastic piece and the mass block. Together with an optimization of a mold of the elastic piece and the mass block, a precision of a position of the elastic piece is high, which improves a consistency of a performance of the vibrating motor, reduces a stress fluctuation of the elastic piece in a vibrating state, and reduces a possibility of fracture and reliability failure of the elastic piece. Moreover, the elastic piece is manufactured by a same mold at the same time, so the two elastic portions disposed on two sides of the elastic piece are consistent, symmetry of the rotor system of the vibrating system is improved, a swing degree of the vibrating motor is reduced, and a performance and a yield level of the vibrating motor are improved. In addition, the elastic piece and the mass block are positioned and manufactured by the same mold, so the elastic piece and the mass block have a compact structure, which saves material usage and reduces manufacturing costs.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor. In the drawing.

In the drawings.

Figure 1:
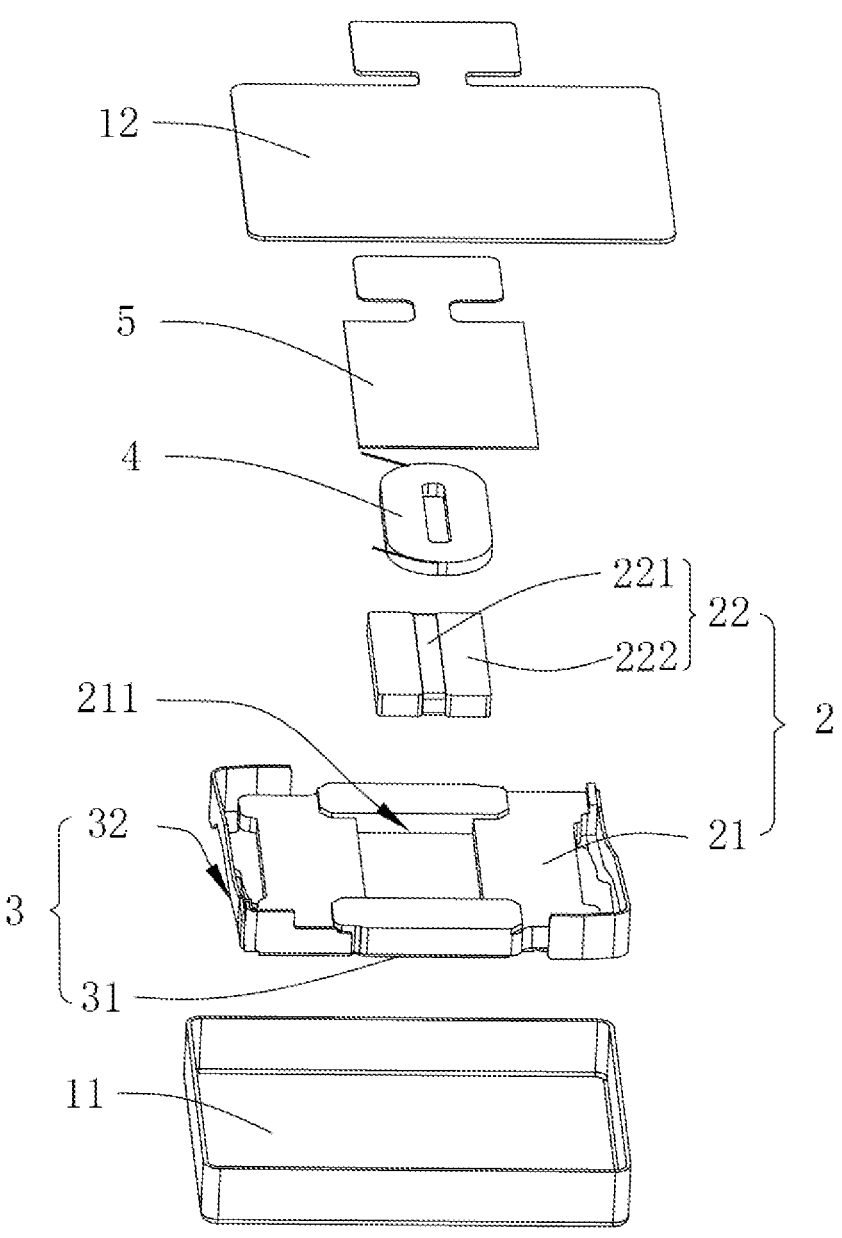
FIG. 1 is an exploded schematic diagram of a vibrating motor according to a first embodiment of the present disclosure.
Figure 2:
FIG. 2 is a perspective schematic diagram of the vibrating motor according to the first embodiment of the present disclosure.
Figure 2:
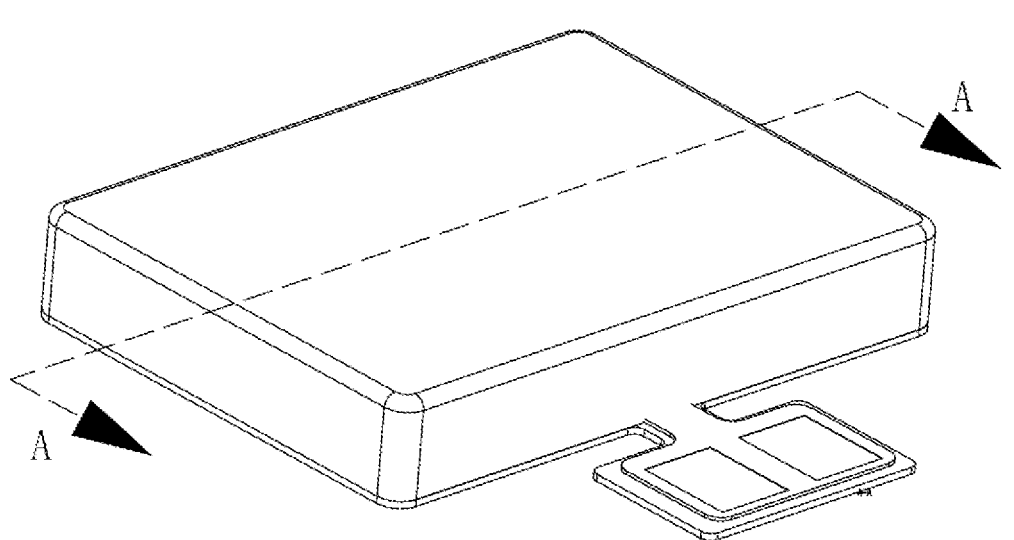
Figure 3:
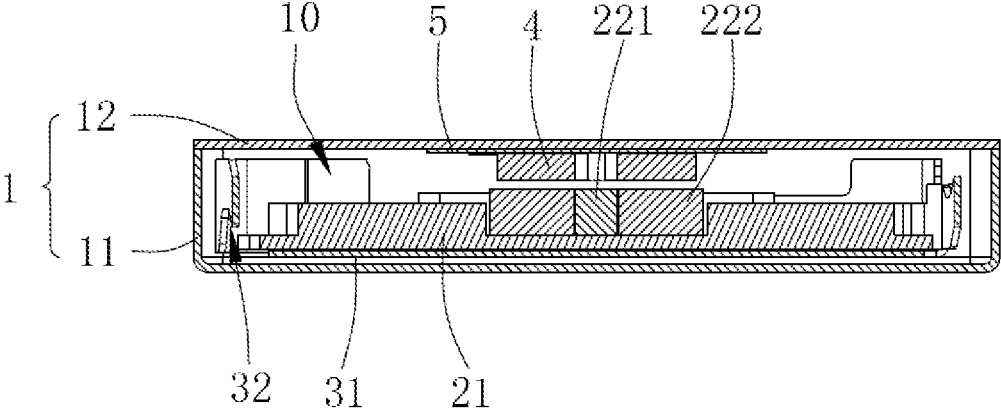
FIG. 3 is a cross-sectional schematic diagram of the vibrating motor taken along the line A-A.
Figure 4:
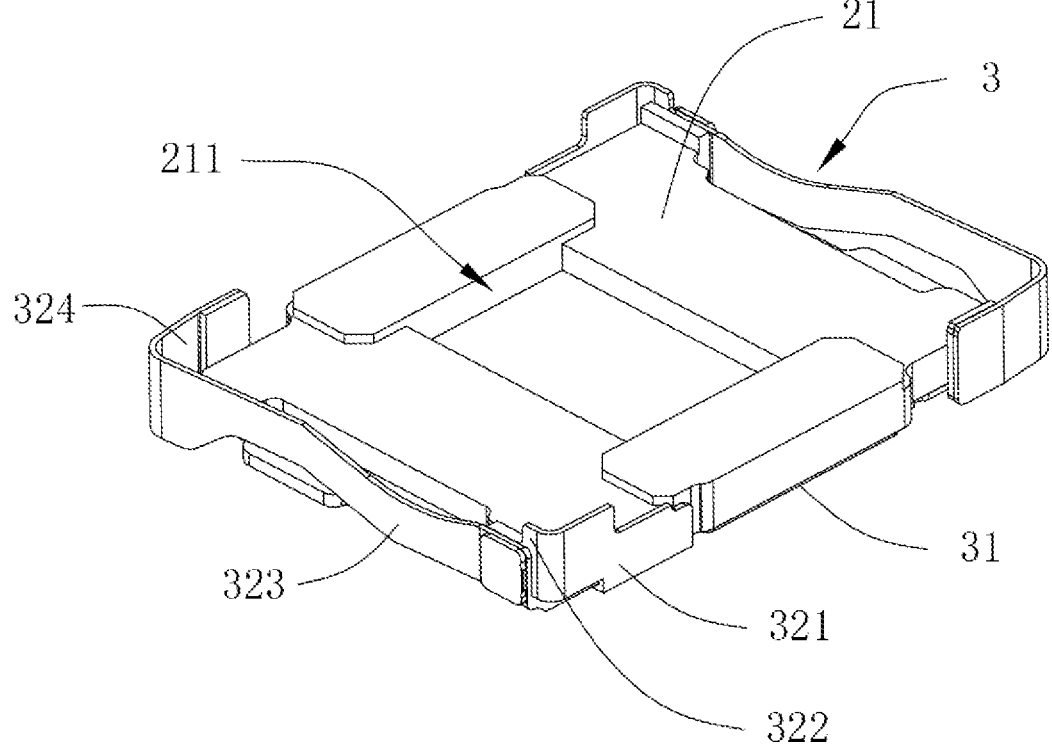
FIG. 4 is a perspective schematic diagram of an elastic piece and a mass block of the vibrating motor according to the first embodiment of the present disclosure where the elastic piece and the mass block are integrally formed.

100—vibrating motor; 1—housing; 10—accommodating space; 11—lower housing; 110—sound outlet; 12—upper housing; 2—vibrating unit; 21—mass block; 211—mounting groove; 22—rotor; 221—main magnetic steel; 222—auxiliary magnetic steel; 223—rotor magnetic steel; 224—rotor pole core; 3—elastic piece; 31—fixing portion; 32—elastic portion; 321—first arm; 322—second arm; 323—elastic arm; 324—fixing arm; 4—driving coil; 5—flexible conductive connecting piece; 6—basin frame; 61—blocking portion; 62—through hole; 7—vibrating system; 71—diaphragm; 711—vibrating portion; 712—first bending annular portion; 713—second bending annular portion; 72—voice coil; 73—frame; 74—auxiliary elastic piece; 8—magnetic circuit system; 80—magnetic gap; 81—lower clamping plate; 82—first main magnetic steel; 83—upper clamping plate; 84—second main magnetic steel; 85—first auxiliary magnetic steel; 86—auxiliary pole core; 9—fixing piece.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

As shown in FIGS. 1-7, the present disclosure provides a vibrating motor 100. The vibrating motor 100 comprises a housing 1 defining an accommodating space 10, a vibrating unit 2 accommodated in the accommodating space 10, an elastic piece 3 elastically suspending the vibrating unit 2 in the accommodating space 10, and a driving assembly fixedly accommodated in the housing. The driving assembly is configured to drive the vibrating unit 2 to vibrate.

The vibrating unit 2 comprises a mass block 21 and a rotor 22 fixed to the mass block 21. The driving assembly is one of at least one driving coil 4 and a magnetic steel assembly.

The rotor 2 is the other one of the at least one driving coil 4 and the magnetic steel assembly. A first end of the elastic piece 3 is fixed to the mass block 21. A second end of the elastic piece 3 is fixed to the housing 1. The elastic piece 3 and the mass block 21 are integrally formed through stamping.

When the driving assembly is the at least one driving coil 4, the rotor 22 is the magnetic steel assembly. When the driving assembly is the magnetic steel assembly, the rotor 22 is the at least one driving coil 4; and a specific setting mode thereof is determined according to actual requirements.

Compared with the prior art, in the vibrating motor 100 of the present disclosure, the elastic piece 3 and the mass block 21 are integrally formed through stamping, so that a precision of a relative position of the elastic piece 3 and the mass block 21 is converted into the tolerance of the elastic piece 3 and the mass block 21. Together with an optimization of a mold of the elastic piece 3 and the mass block 21, a precision of a position of the elastic piece 3 is high, which improves a consistency of a performance of the vibrating motor 100, reduces a stress fluctuation of the elastic piece 3 in a vibrating state, and reduces a possibility of fracture and reliability failure of the elastic piece 3. Moreover, the elastic piece 3 is manufactured by a same mold at the same time, so two elastic portions 32 disposed on two sides of the elastic piece 3 are consistent, symmetry of a rotor system of the vibrating system is improved, a swing degree of the vibrating motor is reduced, and a performance and a yield level of the vibrating motor 100 are improved. In addition, the elastic piece 3 and the mass block 21 are positioned and manufactured by the same mold, so the elastic piece 3 and the mass block 21 have a compact structure, which saves material usage and reduces manufacturing costs.

Specifically, the housing 1 comprises a lower housing 11 and an upper housing 12 covering the lower housing 11. The lower housing 11 and the upper housing 12 define the accommodating space 10.

Specifically, the elastic piece 3 comprises a fixing portion 31 stacked on one side of the mass block 21 and two elastic portions 32. The fixing portion 31 is integrally formed with the mass block 21 by stamping. The two elastic portions 32 are respectively bent and extended from two diagonal positions of the fixing portion 31. Each of the elastic portions 32 comprises a first arm 321, a second arm 322, an elastic arm 323, and a fixing arm 324. Each first arm 321 is bent and extended from the fixing portion 31. Each first arm 321 is attached to a first side of a corresponding corner of the mass block 21. Each second arm 322 is extended perpendicularly from a corresponding first arm 321. Each second arm 322 is attached to a second side of the corresponding corner of the mass block 21. Each elastic arm 323 is bent and extended from the fixing portion 31. Each elastic arm 323 is spaced apart from the mass block 21. Each fixing arm 324 is bent and extended from a first end of a corresponding elastic arm 323 away from a corresponding second arm 322. Each fixing arm 324 is fixed to the housing 1. A second end of each elastic arm 323 close to the corresponding second arm 322 is attached and fixed to the corresponding second arm 322. Two elastic arms 323 are respectively disposed on two opposite sides of the mass block 21. The two elastic portions 32 are symmetrically disposed with respect to a center of the mass block 21.

The fixing portion 31 is configured to enable the elastic piece 3 to have a portion integrally formed with the mass block 21 by stamping. The elastic piece 3 is configured to elastically suspend the vibrating unit 2 in the accommodating space 10, so that the driving assembly drives the vibrating unit 2 to vibrate. Arrangements of each first arm 321 and each second arm 322 of the elastic piece 3 are configured to keep a bottom portion of the elastic piece 3 untwisted in a vertical direction, which enhances a structural strength of the elastic piece 3, increase a weight of the vibrating unit 2, and improves a vibrating amplitude of the vibrating unit 2.

By arrangements of each elastic arm and each fixing arm, the elastic piece 3 is enable to be elastic, and the vibrating unit 2 is elastically suspended in the accommodating space 10. The second end of each elastic arm 323 close to the corresponding second arm 322 is attached and fixed to the corresponding second arm 322 to enhance the structural strength of the elastic piece 3. By setting positions of the elastic piece 3 and the elastic arms 323, the vibrating unit 2 is stably suspended in the accommodating space 10.

Each fixing arm 324 is specifically fixed to a sidewall of the lower housing 11 of the housing 1. Each first arm 321 and each second arm 322 are integrally formed with the mass block 21 by stamping, so that an integral area, forming by stamping, of the elastic piece 3 and the mass block 21 is increased, thereby improving the precision of the position of the elastic piece 3.

Specifically, the vibrating motor 100 further comprises a flexible conductive connecting piece 5 fixed in the housing 1. The flexible conductive connecting piece 5 passes through the housing 1 and extends outwards from the housing 1. The at least one driving coil 4 is electrically connected to the flexible conductive connecting piece 5.

The flexible conductive connecting piece 5 is a flexible printed circuit board (FPCB) to introduce an electrical signal to the at least one driving coil 4, thereby realizing independent control of the vibrating motor 100.

In order to well embody a specific structure of the vibrating motor 100 of the present disclosure, the present disclosure will be explained by two specific embodiments below.

Embodiment 1

As shown in FIGS. 1-4, in the embodiment, one side of the mass block 21 close to the driving assembly is recessed to form a mounting groove 211. The rotor 22 is fixedly accommodated in the mounting groove 211. As a result, the rotor 22 is stably fixed to the mass block 21, while a height space occupied by the rotor 22 is reduced.

In the embodiment, the driving assembly is the at least one driving coil 4 fixed to the housing 1. The rotor 22 is the magnetic steel assembly. The magnetic steel assembly comprises a main magnetic steel 221 fixed in the mounting groove 211 and at least two auxiliary magnetic steels 222 fixed in the mounting groove 211. The at least two auxiliary magnetic steels 222 are respectively disposed on two opposite sides of the main magnetic steel 221.

Specifically, only one driving coil 4 is provided. The driving coil 4 is fixed in the upper housing 12 of the housing 1. Two auxiliary magnetic steels 222 are provided. Of course, according to the actual requirements, four auxiliary magnetic steels 222 may be provided.

In the implementation, the flexible conductive connecting piece 5 is fixed to the upper housing 12, and the driving coil 4 is fixed to one side of the flexible conductive connecting piece 5 away from the upper housing 12. The driving coil 4 is electrically connected to the flexible conductive connecting piece 5.

A working principle of the vibrating motor 100 of the embodiment is as follow:

The driving coil 4 is located in a magnetic field generated by the main magnetic steel 221 and the two auxiliary magnetic steels 222, so the driving coil 4 interacts with the main magnetic steel 221 and the two auxiliary magnetic steels 222 to generate an electromagnetic field. At this time, a mutual driving force of the main magnetic steel 221 and the two auxiliary magnetic steels 222 and the driving coil is controlled by controlling a current direction of the driving coil 4. Moreover, since the driving coil 4 is fixed in the accommodating space 10, the driving coil 4 is acted as a stator system. Since the main magnetic steel 221, the auxiliary magnetic steel 222, and the mass block 21 are elastically suspended in the accommodating space 10 through the elastic piece 3, the main magnetic steel 221, the auxiliary magnetic steel 222, and the mass block 21 are acted as the rotor system. In this way, the driving coil 4 drives the main magnetic steel 221, the two auxiliary magnetic steels 222, and the mass block 21 to simultaneously vibrate, thereby driving the vibrating motor 100 to vibrate.

Embodiment 2

Figure 5:
FIG. 5 is an exploded schematic diagram of the vibrating motor according to a second embodiment of the present disclosure.
Figure 6:
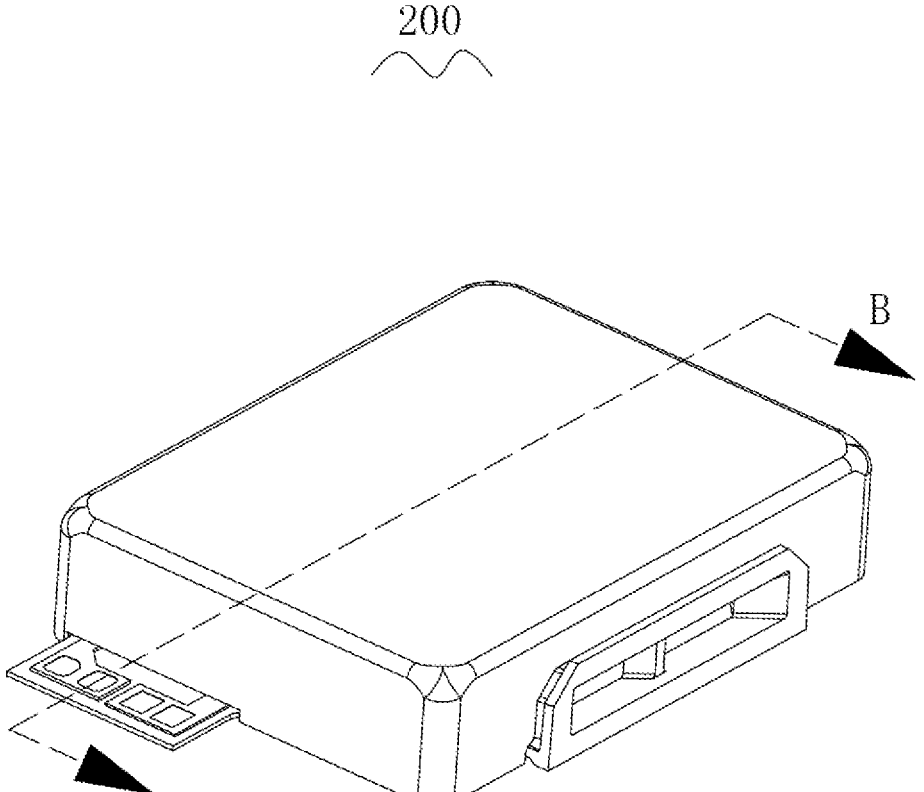
FIG. 6 is a perspective schematic diagram of the vibrating motor according to the second embodiment of the present disclosure.
Figure 7:
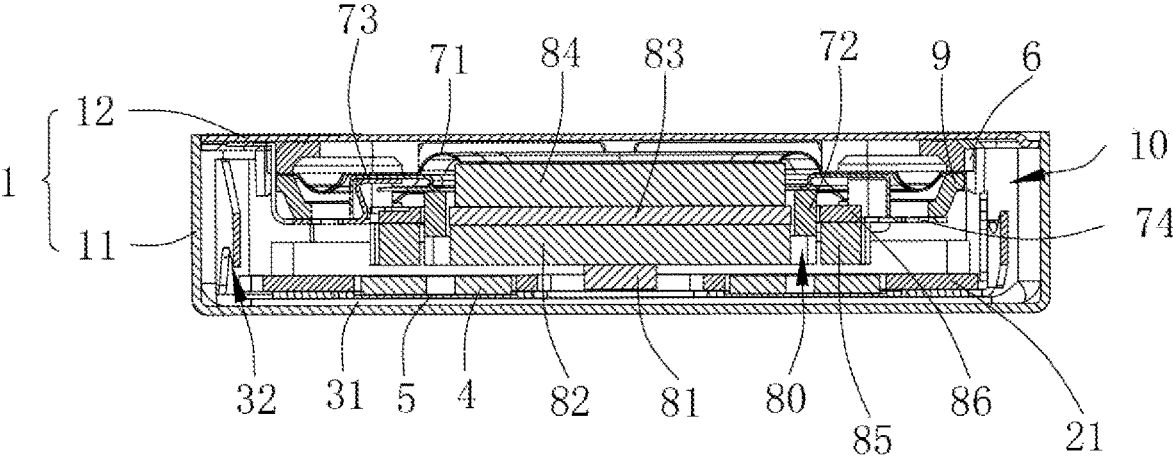
FIG. 7 is a cross-sectional schematic diagram of the vibrating motor taken along the line B-B.

As shown in FIGS. 5-7, the housing 1 defines a sound outlet 110 penetrating the housing 1. The vibrating unit 2 further comprises a basin frame 6 fixed to the housing 1, a vibrating system 7 fixed to the basin frame 6, and a magnetic circuit system 8 fixed to the basin frame 6. The magnetic circuit system 8 is configured to drive the vibrating system 7 to vibrate. The vibrating system 7 is communicated with the sound outlet 110 to generate sound. The driving assembly and the magnetic circuit system 8 are the magnetic steel assembly. The rotor 22 is the at least one driving coil 4 fixed to the mass block 21.

The basin frame 6, the vibrating system 7, and the magnetic circuit system 8 constitute a sounding device or a sounding unit for sounding.

Specifically, the sound outlet 110 is defined on the sidewall of the lower housing 11. One side of the basin frame 6 close to the upper housing 12 is fixed to the upper housing 12. The magnetic circuit system 8 defines a magnetic gap 80. The sounding unit further comprises a fixing piece 9. The fixing piece is ring-shaped. One side of the fixing piece 9 close to the vibrating system 7 is fixed to the basin frame 6. One side of the magnetic circuit system 8 close to the fixing piece 9 is fixed to the fixing piece 9. That is, the magnetic circuit system 8 is indirectly fixed to the basin frame 6 through the fixing piece.

In the embodiment, the vibrating system 7 comprises a diaphragm 71 fixed to the basin frame 6, a voice coil 72, a frame 73 fixed to the diaphragm, and auxiliary elastic pieces 74. The voice coil 72 is inserted into the magnetic gap 80 and is suspended in the magnetic gap 80. The voice coil 72 drives the diaphragm 71 to vibrate. The auxiliary elastic pieces 74 are spaced apart from the diaphragm 71. The diaphragm 71 is fixedly clamped between the fixing piece 9 and the basin frame 6. The voice coil 72 is elastically suspended in the magnetic gap 80 by the frame 73. A first end of each of the auxiliary elastic pieces 74 is fixed to one side of the fixing piece 9 away from the basin frame. A second end of each of the auxiliary elastic pieces 74 is fixed to one end of the frame 73 away from the voice coil 72.

Specifically, the diaphragm 71 and the upper housing 12 are spaced apart to form a sound generating inner cavity (not shown in the drawings). The basin frame 6 comprises a blocking portion 61 extending outward from a sidewall of the basin frame 6 and a through hole 62 penetrating the blocking portion 61. The blocking portion 61 passes through the sound outlet 110. The through hole 62 is communicated with the sound generating inner cavity. The through hole 62 is configured to transmit sound emitted by the diaphragm 71 outward.

The diaphragm 71 comprises a vibrating portion 711, a first bending annular portion 712, and a second bending annular portion. The vibrating portion is annular. An inner peripheral edge of the vibrating portion 711 is bent and extended to form the first bending annular portion 712. An outer peripheral edge of the vibrating portion 711 is bent and extended to form the second bending annular portion 713. An inner peripheral edge of the first bending annular portion 712 is fixed to the magnetic circuit system 8, and an outer peripheral edge of the second bending annular portion 713 is fixedly clamped between the basin frame 6 and the fixing piece 9.

Two auxiliary elastic pieces 74 are provided and are arranged on two opposite sides of the basin frame 6. One of the auxiliary elastic pieces 74 passes through the sidewall of the lower housing of the housing 1 and is exposed outwards. The one of the auxiliary elastic pieces 74 is an FPCB configured to introduce an electrical signal to the voice coil 72, so as to realize an independent control of the sounding unit.

In the embodiment, the magnetic circuit system 8 comprises a lower clamping plate 81, a first main magnetic steel 82, an upper clamping plate 83, a second main magnetic steel 84, first auxiliary magnetic steels 85, and an auxiliary pole core 86. The first main magnetic steel 82 is fixedly stacked on one side of the lower clamping plate 81 close to the vibrating system 7. The upper clamping plate 83 is fixedly stacked on one side of the first main magnetic steel 82 close to the vibrating system 7. The second main magnetic steel 84 is fixedly stacked on one side of the upper clamping plate 83 close to the vibrating system 7. The first auxiliary magnetic steels 85 are disposed around the first main magnetic steel 82. The first auxiliary magnetic steels 85 are spaced apart from the first main magnetic steel 82 to form the magnetic gap 80. The auxiliary pole core 86 is fixedly stacked on one side of each of the first auxiliary magnetic steels 85 close to the vibrating system 7.

Specifically, four first auxiliary magnetic steels 85 are provided and are respectively disposed on four sides of the first main magnetic steel 82. One auxiliary pole core 86 is provided and is ring-shaped to be stacked on the four first auxiliary magnetic steels 85.

The auxiliary pole core 86 is fixed on one side of the fixing piece 9 away from the basin frame 6. Two of the four first auxiliary magnetic steels 85 are respectively stacked and fixed on one side of the lower clamping plate 81 close to the vibrating system 7. The two of the four first auxiliary magnetic steels 85 arranged opposite to each other. The inner peripheral edge of the first bending annular portion 712 is fixed on one side, away from the upper clamping plate 83, of the second main magnetic steel 84 of the magnetic circuit system 8.

By fixing the auxiliary pole core 86 to the fixing piece 9, the second main magnetic steel 84 is fixed to the first bending annular portion 712. By fixing the two of the auxiliary magnetic steels 85 to the lower clamping plate 81, the magnetic circuit system 8 is indirectly fixed to the frame 6, so that the magnetic circuit system 8 is fixedly disposed.

In the embodiment, the mass block 21 defines a first through hole (not shown in the drawings) penetrating the mass block 21. The lower clamping plate 81 is disposed in the first through hole, which reduces the height space occupied by the lower clamping plate 81.

In the embodiment, the rotor 22 further comprises two rotor magnetic steels 223 and two rotor pole cores 224. The rotor magnetic steels 223 are fixed to the mass block 21. The rotor magnetic steels 223 are respectively disposed on two opposite sides of the first main magnetic steel 82. Each of the two rotor pole cores 224 is fixedly stacked on one side of a corresponding rotor magnetic steel 223 away from the mass block 21. Two driving coils 4 are provided. The two driving coils 4 are fixed to the mass block 21 at intervals. The two driving coils 4 are disposed between the two rotor magnetic steels 223.

In the embodiment, second through holes are defined on positions of the mass block 21 corresponding to the two driving coils 4. The flexible conductive connecting piece 5 is disposed on one side of the mass block 21 away from the magnetic circuit system 8. The two driving coils 4 are one-to-one disposed in the two second through holes and are electrically connected to the flexible conductive connecting piece 5, which reduces a height space occupied by the driving coils 4.

A working principle of the vibrating motor 100 of the embodiment is as follow:

The driving coils 4 are located in a magnetic field generated by the magnetic circuit system 8, so the driving coils 4 interact with the magnetic circuit system 8 to generate an electromagnetic field. At this time, a mutual driving force of the magnetic circuit system 8 and the driving coils is controlled by controlling a current direction of the driving coils 4. Moreover, since the magnetic circuit system 8 is indirectly fixed to the housing 1, the magnetic circuit system 8 is acted as a stator system. Since the driving coils 4, the rotor magnetic steels 223, the rotor pole cores 224, and the mass block 21 are elastically suspended in the accommodating space 10 by the elastic piece 3, the driving coils 4, the rotor magnetic steels 223, the rotor pole cores 224, and the mass block 21 are acted as a rotor system. In this way, the magnetic circuit system 8 drives the driving coils 4, the rotor magnetic steels 223, the rotor pole cores 224, and the mass block 21 to simultaneously vibrate, thereby driving the vibrating motor 100 to vibrate.

The above are only the embodiments of the present disclosure. It should be pointed out that for those of ordinary skill in the art, improvements can be made without departing from the inventive concept of the present disclosure, and these improvements fall within the protection scope of the present disclosure.

What is claimed is:

1. A vibrating motor, comprising:
   a housing defining an accommodating space,
   a vibrating unit accommodated in the accommodating space,
   an elastic piece elastically suspending the vibrating unit in the accommodating space, and
   a driving assembly fixedly accommodated in the housing;
   wherein the driving assembly is configured to drive the vibrating unit to vibrate; the vibrating unit comprises a mass block and a rotor fixed to the mass block; the driving assembly is one of at least one driving coil and a magnetic steel assembly; and the rotor is the other one of the at least one driving coil and the magnetic steel assembly; a first end of the elastic piece is fixed to the mass block; a second end of the elastic piece is fixed to the housing; the elastic piece and the mass block are integrally formed through stamping;
   wherein the elastic piece comprises a fixing portion stacked on one side of the mass block and two elastic portions; the fixing portion is integrally formed with the mass block by stamping; the two elastic portions are respectively bent and extended from two diagonal positions of the fixing portion; each of the elastic portions comprises a first arm, a second arm, an elastic arm, and a fixing arm; each first arm is bent and extended from the fixing portion; each first arm is attached to a first side of a corresponding corner of the mass block; each second arm is extended perpendicularly from a corresponding first arm; each second arm is attached to a second side of the corresponding corner of the mass block; each elastic arm is bent and extended from the fixing portion; each elastic arm is spaced apart from the mass block; each fixing arm is bent and extended from a first end of a corresponding elastic arm away from a corresponding second arm; each fixing arm is fixed to the housing; a second end of each elastic arm close to the corresponding second arm is fixedly attached to the corresponding second arm; two elastic arms are respectively disposed on two opposite sides of the mass block; the two elastic portions are symmetrically disposed with respect to a center of the mass block.

2. The vibrating motor according to claim 1, wherein each first arm and each second arm are integrally formed with the mass block by stamping.

3. The vibrating motor according to claim 1, wherein one side of the mass block close to the driving assembly is recessed to form a mounting groove; the rotor is fixedly accommodated in the mounting groove.

4. The vibrating motor according to claim 3, wherein the driving assembly is the at least one driving coil fixed to the housing; the rotor is the magnetic steel assembly; the magnetic steel assembly comprises a main magnetic steel fixed in the mounting groove and at least two auxiliary magnetic steels fixed in the mounting groove; the at least two auxiliary magnetic steels are respectively disposed on two opposite sides of the main magnetic steel.

5. The vibrating motor according to claim 4, wherein the vibrating motor further comprises a flexible conductive connecting piece fixed in the housing; the flexible conductive connecting piece passes through the housing and extends outwards from the housing; the at least one driving coil is electrically connected to the flexible conductive connecting piece.

6. The vibrating motor according to claim 1, wherein the housing defines a sound outlet penetrating the housing; the vibrating unit further comprises a basin frame fixed to the housing, a vibrating system fixed to the basin frame, and a magnetic circuit system fixed to the basin frame; the magnetic circuit system is configured to drive the vibrating system to vibrate; the vibrating system is communicated with the sound outlet to generate sound; the driving assembly and the magnetic circuit system are the magnetic steel assembly; the rotor is the at least one driving coil fixed to the mass block.

7. The vibrating motor according to claim 6, wherein the magnetic circuit system comprises a lower clamping plate, a first main magnetic steel, an upper clamping plate, a second main magnetic steel, first auxiliary magnetic steels, and an auxiliary pole core;
   wherein the first main magnetic steel is fixedly stacked on one side of the lower clamping plate close to the vibrating system; the upper clamping plate is fixedly stacked on one side of the first main magnetic steel close to the vibrating system; the second main magnetic steel is fixedly stacked on one side of the upper clamping plate close to the vibrating system; the first auxiliary magnetic steels are disposed around the first main magnetic steel; the first auxiliary magnetic steels are spaced apart from the first main magnetic steel to form a magnetic gap; the auxiliary pole core is fixedly stacked on one side of each of the first auxiliary magnetic steels close to the vibrating system; two of the first auxiliary magnetic steels are fixedly stacked on one side of the lower clamping plate close to the vibrating system; the two of the first auxiliary magnetic steels are disposed opposite to each other;

wherein the vibrating motor further comprises a fixing piece; the fixing piece is ring-shaped; a first side of the fixing piece close to the basin frame is fixed to the basin frame; the auxiliary pole core is fixed to a second side of the fixing piece away from the basin frame.

8. The vibrating motor according to claim 7, wherein the rotor further comprises two rotor magnetic steels and two rotor pole cores; the rotor magnetic steels are fixed to the mass block; the rotor magnetic steels are respectively disposed on two opposite sides of the first main magnetic steel;

each of the two rotor pole cores is fixedly stacked on one side of a corresponding rotor magnetic steel away from the mass block; two driving coils are provided; the two driving coils are fixed to the mass block at intervals; the two driving coils are disposed between the two rotor magnetic steels.

9. The vibrating motor according to claim 7, wherein the vibrating system comprises a diaphragm fixed to the basin frame, a voice coil, a frame fixed to the diaphragm, and auxiliary elastic pieces; the voice coil is inserted into the magnetic gap and is suspended in the magnetic gap; the voice coil drives the diaphragm to vibrate; the auxiliary elastic pieces are spaced apart from the diaphragm; the diaphragm is fixedly clamped between the fixing piece and the basin frame; the voice coil is elastically suspended in the magnetic gap by the frame; a first end of each of the auxiliary elastic pieces is fixed to one side of the fixing piece away from the basin frame; a second end of each of the auxiliary elastic pieces is fixed to one end of the frame away from the voice coil.

* * * * *